Oct. 18, 1938.   H. C. STEARNS   2,133,488
HEATER AND HEATING SYSTEM FOR AUTOMOTIVE VEHICLES
Filed March 29, 1937   3 Sheets-Sheet 1
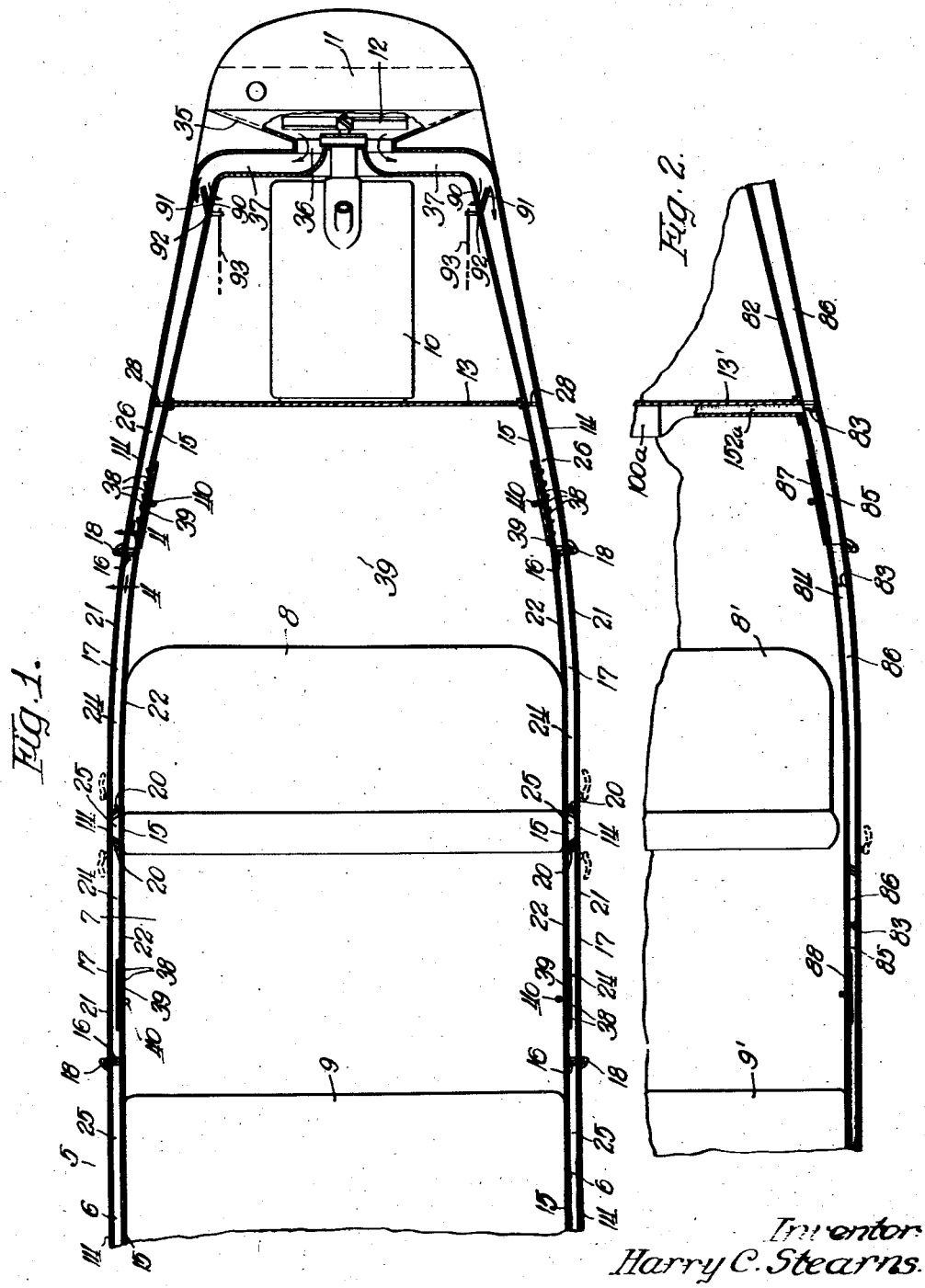
Inventor
Harry C. Stearns.
By
Attys

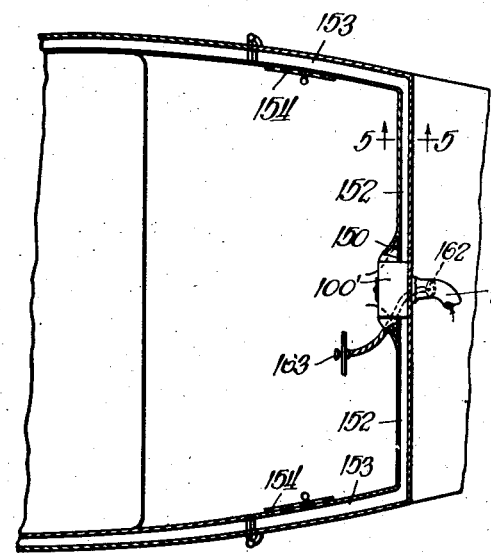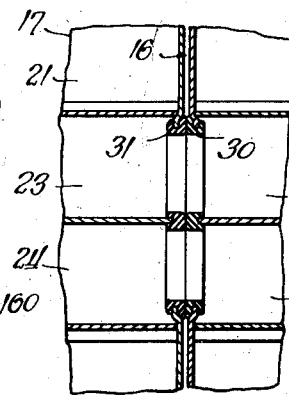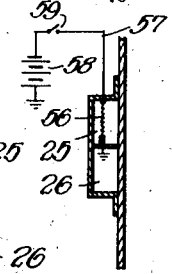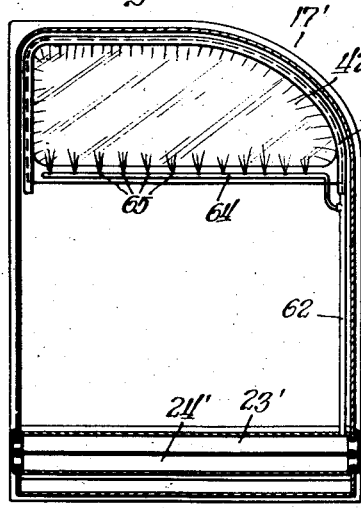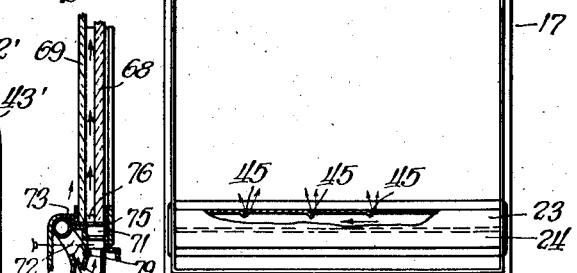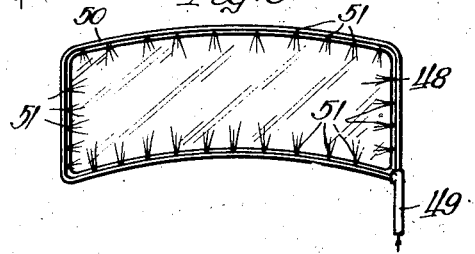

Oct. 18, 1938.  H. C. STEARNS  2,133,488
HEATER AND HEATING SYSTEM FOR AUTOMOTIVE VEHICLES
Filed March 29, 1937   3 Sheets-Sheet 3

Inventor:
Harry C. Stearns.
By
Brown, Jackson, Boettcher & Dienner
Attys

Patented Oct. 18, 1938

2,133,488

UNITED STATES PATENT OFFICE 2,133,488

HEATER AND HEATING SYSTEM FOR AUTOMOTIVE VEHICLES

Harry C. Stearns, Glen Ellyn, Ill.

Application March 29, 1937, Serial No. 133,595

5 Claims. (Cl. 98—2)

This invention relates to heaters and heating systems for automotive vehicles, and although not limited thereto, the invention has to do particularly with heaters and heating systems in which the air is heated by passing through a fluid heated radiator.

At present the automobile public is adopting generally a dash type heater which obtains its heat from the water of the motor cooling system by circulating the water at about 160° F. through a radiator mounted within the casing of the heater. The air is circulated through this radiator by an electric motor-driven fan positioned behind the heater radiator.

These dash type hot water heaters of the character now in general use are of limited capacity, i. e., they provide only a limited volume of heated air, and their efficiency is relatively low. On cold days—particularly on zero and sub-zero days— the average dash type heater of this sort just keeps warm or comfortable the occupant adjacent the heater—usually the occupant of the right front seat—but has little effect on the remainder of the interior of the vehicle. Where the heater is of oversize construction, the occupant adjacent the heater is usually kept uncomfortably warm, whereas the other occupants or passengers are not kept comfortable.

In other words, these prior art heaters concentrate the heat in one spot and are not capable of developing enough heat to warm the car in cold weather. If a side wind is blowing, one side of the vehicle is invariably almost unbearably cold, particularly near the floor. These heaters are usually of a size to take practically all of the available space beneath the dash. The circulating fan is capable only of setting the air in motion behind the comb of the heater radiator, where it is unrestricted, and is not capable of forcing sufficient warm air at high velocity to all parts of the interior of the vehicle, and even if it were capable of forcing sufficient warm air at high velocity, the concentration of the same at one spot would be highly objectionable.

Where a portion of the heated air is used for defrosting, the limited volume of such heated air which is available with the prior art heaters usually is not sufficient to assure satisfactory defrosting, particularly under severe weather conditions. The efforts at defrosting have usually been limited to the windshield. In cold weather, if there is more than one occupant within the vehicle, and sometimes with only one occupant, there is frost over all of the windows except the portions covered by frost shields which give but a few peek holes to look through and permit of only a restricted vision. If circulating fans are employed, they have a chilling effect on the passengers, and if the windows are opened the passengers are chilled and their health endangered.

With the horizontal circulation of the air through the radiators of these heaters and a pressure circulation of the water, convection is playing no useful part in the prior art structures. As the temperature gradient between the air and the water is seldom much more than 100° F., radiation is a negligible factor. The heat is transferred from the water circulating through the radiator to the air which is passed through the radiator principally by conduction, which means that each molecule of gas in the air must be brought into actual contact with the heating surface to accomplish an efficient heat transfer.

This necessitates a large amount of heating surface which, in a small space, restricts the flow of air through the heater and necessitates a pressure circulation of air which is not satisfactorily accomplished by the circulating fan arrangements now in use.

Consider a case where a motor has been warmed up with an outside temperature of 30° F. below zero, which is an extreme case in which a heater is most needed. The water of the heater is at approximately 140° F. The air at minus 30° F. starts through the heater comb. Due to the extreme difference of temperature between the air and the water in the rear tubes of the heater comb, the air takes on heat fast and begins to expand. It then passes the next set of tubes. As the temperature difference at this point is less than at the first point, it takes on less heat than in the first stage, and the temperature rises less. It expands more and more as it goes through the succeeding stages, and takes on less heat at each stage due to the decrease in temperature difference and still less due to the increased velocity or lessening of the time in contact with the tubes caused by the expansion of the air as it becomes heated more and more. This makes the forward portion of the heater much less efficient than the rear, and in some cases makes it almost worthless.

According to my invention, I provide a heater and heating system which will produce a large amount of heated air adequate to heat the entire interior of the vehicle as suitable or desired under the most severe weather conditions, and which is also operable to provide sufficient heated air for satisfactorily defrosting, desleeting, and preventing moisture and condensation formation on the windshield, and also if and as desired on all other windows of the vehicle under the most severe weather conditions.

A further aspect of the invention consists in an improved system for distributing the heated air throughout the interior of the vehicle to keep all passengers comfortable without at any time concentrating the heat at any one position and rendering the occupant at that position uncomfortable. This is accomplished by circulating the heated air through the space between the outer and inner walls of the wall structure of the vehicle body and discharging the same into different portions of the vehicle through adjustable registers at different locations. The adjustable registers may be separately controlled manually at the respective registers, or manually from remote position, or thermostatically, all as will hereinafter appear, to control the heat distribution, or the control of these registers may be accomplished as otherwise suitable or desired.

Another aspect of the invention consists in an improved system for distributing a portion of the heated air to the windshield and to the various windows of the vehicle for defrosting and desleeting and preventing moisture and condensation formation thereon.

Another aspect of the invention consists in the provision of means for by-passing the heated air from the distributing system through the engine compartment, to avoid any insufficiency in air circulation through this compartment and overheating on warm days.

Another aspect of the invention consists in an improved heater which is highly efficient and is operable to provide a large volume of heated air.

Numerous other advantages and numerous adaptations and modifications of the invention will be apparent from the following detailed description taken in connection with the accompanying drawings, in which:

Figure 1 is a fragmentary and more or less diagrammatic horizontal section through a motor vehicle, showing one embodiment of the present invention in connection therewith;

Figure 2 is a fragmentary horizontal section similar to Figure 1, showing the duct means divided to provide separate supplies of heated air to the registers for the front and rear compartments of the vehicle;

Figure 3 is an inner side view of one of the doors with the inner wall thereof broken away to show the manner in which the heated air is circulated through the door and around the window;

Figure 4 is a fragmentary vertical detail section taken on the line 4—4 of Figure 1, and showing the means for providing tight connections between the open ends of the heat distributing ducts disposed within the door and within the wall structure of the vehicle body;

Figure 5 is a fragmentary detail view showing an auxiliary heater arrangement for the air which is used for defrosting purposes;

Figure 6 is a view showing the windshield of the vehicle and one method of circulating the heated air around the windshield and discharging this air against the windshield for defrosting purposes;

Figure 7 is a view of a door similar to Figure 3, showing a modified system of distributing the heated air through the door and to the window thereof;

Figure 8 is a fragmentary vertical section through a modified form of windshield, and showing a modified system for distributing the heated air thereto;

Figure 11 is a fragmentary horizontal section through a vehicle, showing another embodiment of the present invention in connection therewith.

Figure 9:
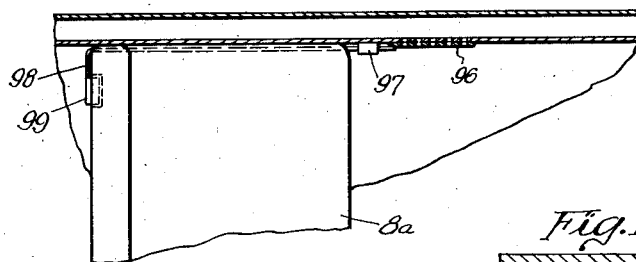
Figure 9 is a fragmentary horizontal section through one side wall of the vehicle, showing a thermostatic control for the heat register through which the heated air is discharged into the vehicle.

Referring first to the embodiment of the invention shown in Figure 1 of the drawings, 5 designates generally any suitable or preferred automobile body. This body 5 has side wall structures 6 enclosing the passenger compartment 7 within the body of the vehicle, which passenger compartment 7 is provided with a front seat 8 and a rear seat 9. The body 5 may be of any desired type and may have two cross seats as shown, or a single cross seat, or any other seating arrangement, such variations as are required in embodying the invention in other types of bodies being contemplated within the scope of the appended claims.

The vehicle shown has an engine 10 and the usual radiator 11 commonly disposed at the front of the vehicle and connected to the water jacket of the engine for cooling the heated water. A rotary fan 12 driven from the engine shaft functions in the usual manner to draw air through the radiator 11, which radiator may be of any existing or preferred form. The water is circulated through the cooling system by any existing or preferred water circulating pump (not shown). A dash or partition 13 separates the engine compartment from the driver's compartment, as well understood in the art.

Each side wall structure 6 comprises an outer wall 14 usually formed of sheet metal and an inner wall 15 spaced therefrom. The inner wall 15 is usually formed of fiberboard or the like, and the interior finishing fabric is usually secured thereto, but this may be varied within the scope of the present invention. If desired, the inner surface of the outer wall 14 may be lined with suitable heat insulating material to prevent heat loss out through the wall structure of the vehicle.

The side wall structures 6 have door openings 16 formed therein, the particular body shown having a front door opening and a rear door opening at each side wall structure. The number of door openings and the arrangement of such openings of course will vary with different types of bodies. Each door opening 16 is provided with a door 17 hinged at 18 to the side or jamb of the doorway to be swung to open and closed positions. Each door 17 is preferably provided with the usual outside and inside handles, and preferably with the usual snap latch mechanism for holding the door closed. Door locks may be provided in the usual manner.

The free vertical marginal edge of each door, i. e. the edge opposite the edge hinged at 18, is preferably formed obliquely, as shown at 20, and the adjacent edge of the side or jamb of the doorway is preferably of corresponding oblique form for a purpose which will presently appear.

The doors 17 have outer walls 21 and inner walls 22 spaced therefrom, these outer and inner door walls corresponding with the outer and inner walls 14 and 15 of the wall structure 6. Each door 17 is provided with a pair of superposed sheet metal or other suitable ducts 23 and 24 disposed in the space between the walls 21 and 22 and extending horizontally between the hinged edge and the opposite edge of each door. These ducts 23 and 24 are aligned, and when the doors are closed, register at their opposite open ends with the adjacent open ends of corresponding ducts 25 and 26 disposed between the outer and inner walls 14 and 15 of the wall structure of the vehicle body to provide, in effect, two continuous ducts extending through the side walls and doors at each of the opposite sides of the body of the vehicle. The forward open ends of the ducts 25 and 26 are indicated at 28 in Figure 1.

For the purpose of forming tight connections between the ducts 23, 24 and 25, 26, rubber or other suitable yielding facing members 30 are suitably secured, for example, as shown in Figure 4, around the open ends of the vehicle body wall ducts 25, 26 at the hinge side of each doorway 16. Similar rubber or yielding facing members 31 are provided around the adjacent open ends of the ducts 23, 24, these latter facings 31 being secured to the doors 17. When the doors are closed the facings 31 yieldingly engage the facings 30 tightly to connect the ducts at the hinge sides of the doorways.

The open ends of the ducts 23, 24 and 25, 26 are tightly connected at the oblique edges 20 of the doors by rubber or other yielding facings similar to the facings 30 and 31 but disposed obliquely to conform with the cooperating obliquely disposed edges 20. This oblique disposition of these latter facings assures, when the doors are closed, tight connection between the ducts at the sides of the doors 17 opposite the sides at which said doors are hinged.

In the embodiment of Figure 1, I utilize the main cooling radiator 11 of the cooling system of the vehicle for heating the air which is used for heating the interior of the vehicle and for such other purposes as will hereinafter appear. This is accomplished by providing a sheet metal shroud 35 around the fan 12 and mounting an air header 36 rearwardly behind this shroud. The shroud 35 flares or diverges forwardly to the rear side of the radiator 11 so that the air which is drawn by the fan 12 through the radiator 11 to cool the cooling water and which air is heated by the radiator 11 is delivered through the shroud and into the header 36 instead of being circulated rearwardly through the engine compartment.

The header 36 has a pair of outlet ducts 37 which extend laterally and rearwardly, and are connected at their rear ends to the forward ends 28 of the ducts 25, 26 to deliver the air heated by the radiator 11 to these latter ducts. The main radiator 11 thus forms the means for heating the air, and the fan 12 forms not only the means for drawing cold air through the radiator 11 to cool the water circulating therethrough, but also the means for taking this air after it is heated in serving its usual purpose and circulating it through the ducts 23, 24 and 25, 26.

Figure 12:
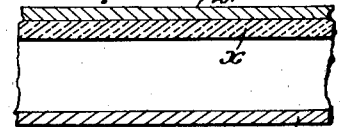
Figure 12 is a fragmentary detail section.

While the duct arrangement which I have described is preferable, I contemplate within the scope of the broader aspects of the invention omitting the ducts and circulating the heated air directly through the space between the outer and inner walls of the vehicle body and doors. In such cases, the inner surfaces of the outer metal walls of the vehicle body and doors are preferably covered or lined with heat insulating paper or other suitable heat insulating material and indicated more or less diagrammatically at $x$ in Figure 12.

For the purpose of discharging the heated air from the ducts 24, 26 into the interior of the vehicle to heat the same, the inner wall of each door duct 24 and the inner wall 22 of each door 17 have openings 38 disposed near the floor of the vehicle and opening into the interior of the vehicle. In the illustrated embodiment of the invention, the opening means 38 at each door is in the form of a register provided with a manually operable shutter 39 for controlling the discharge of heated air into the interior of the vehicle. Each shutter 39 is shown as having a fingerpiece 40 for manually operating the same. Each shutter being operable independently of the other shutters I thus provide for separately and selectively controlling the discharge of heated air into the vehicle from the differently located registers.

Each door 17 has a glass pane or window as shown at 42 in Figure 3. These windows 42 are usually mounted in moldings 43 which surround the top and extend down vertically along the front and rear edges of the windows. The molding 43 is usually generally channel shaped in section, and, as shown, the opposite open ends of these channel-shaped moldings open downwardly into the space between the inner and outer walls of the door. Suitable packing may be provided for seating the windows in the window moldings 43, as well understood in the art.

Each upper door duct 23 has a plurality of openings 45 for delivering the heated air therefrom into the space between the inner and outer walls of the door, and through this space and into and around the molding channels 43. By using the internal cavity of the door with the window molding members in this manner, the hot air from the ducts 23 travels up over the glass pane from the lower edge thereof and through the molding channels, around the entire margin of the pane, heating the glass uniformly so as to avoid breakage, and by such heating defrosting, desleeting, and preventing condensation and moisture formation on the windows. The hot air being distributed around the glass will keep it warm enough to accomplish these results, and the action is assisted materially by the hot air leaking out around the window packing and over the surface of the window.

Where it is desired to defrost, desleet, and prevent condensation and the formation of moisture on the windshield indicated at 48 in Figure 6, a tube or duct 49 is led up from the cross-header, or up from one of the upper ducts, and surrounds or enframes the windshield 48 as indicated at 50. The windshield surrounding portion 50 of this tube has openings 51 marginally around the windshield, through which openings the heated air is discharged against the glass to heat the same uniformly, thereby defrosting and desleeting the windshield, and preventing the formation of condensation and moisture thereon, all without breakage of the glass.

Instead of employing the tube surrounding the glass as shown in Figure 6, the heated air may be permitted to circulate up around the glass as now mounted, and discharged out of slots or openings onto the glass, or, if desired, the heated air may just heat the glass by encircling it.

Another arrangement at the windshield consists in providing some of the holes on the outside of the glass so shielded at the front that the partial vacuum created at the jet, as the wind created by the forward motion of the car is deflected by the shield, would destroy any tendency to back pressure and assist in pulling the hot air out, which would then be carried by the air currents up over the glass.

The rear window of the vehicle and any windows in the side walls of the vehicle body may be similarly supplied with heated air for the purpose of defrosting and desleeting the same and preventing the formation of condensation and moisture thereon. In the case of the rear window, a tube may be led up from the rear duct of the space between the outer and inner walls of the rear wall structure (not shown) to an enframing tube around the rear window from which the heated air may be discharged through suitable openings against the glass for defrosting, desleeting and slight warming of the same to prevent condensation and moisture formations thereon.

In view of the time lag in setting up a supply of heated air, particularly when the engine is started cold, the cross header or upper duct system, indicated at 25 in Figure 5, may be provided with an auxiliary heater for heating the air which is circulated through the upper duct system for defrosting and desleeting the windows, and preventing condensation and moisture formation thereon, at least until the air is brought up to the desired temperature by the hot water heating means. This auxiliary heater may be used only until the air is heated to the desired temperature by the hot water heating means, or it may be used in conjunction with the hot water heating means.

In the embodiment illustrated in Figure 5, this auxiliary heater is in the form of an electric resistance element 56 connected into a circuit 57, which may be the generator circuit or another suitable circuit on the vehicle. A suitable source of current is indicated diagrammatically at 58. A switch is shown at 59 for closing and opening the circuit 57 selectively to bring the heater 56 into action or to discontinue the action of this heater.

In the embodiment of the invention shown in Figure 7, the door 17' is provided with an upper duct 23' and a lower duct 24' similar to the ducts in the preceding embodiment of the invention, and with a window 42' mounted in a window molding 43'. The heated air may be discharged from the lower duct 24' into the interior of the vehicle in the manner previously described, but the upper duct 23', instead of having openings through which the heated air for defrosting, desleeting, and preventing condensation and moisture formation on the window 42' directly through the internal cavity in the door, a tube 62 leads up from the upper duct 23' within the space between the inner and outer walls of the door, and opens at its upper end into one end of the window molding 43' which delivers the heated air completely about the margin of the window except for the lower edge thereof. A tube 64 is connected to the tube 62 and extends along the lower edge of the window 42'. This tube 64 has openings 65 along the lower edge of the window 42' for discharging the heated air up over the lower margin of the window.

In the embodiment of the invention shown in Figure 8, the windshield comprises an outer pane 68 and an inner pane 69 spaced therefrom. A tube or duct 70 leads from the cross-header or upper duct system, and has an opening 71 for discharging heated air between the panes 68 and 69, and a second or branch opening 72, having outlets 73 for discharging heated air against the inner surface of the inner pane 69. The body framework is indicated at 74, the window frame at 75, and spacer means is shown at 76 for spacing the panes 68 and 69. A valve or shutter 78 is pivoted at 79 and provided with suitable means (not shown) for manually swinging the same to cause the heated air delivered up through the tube or duct 70 to pass between the panes 68 and 69, or through the openings 73 against the inner surface of the inner pane 69, or partially through the space between the panes and partially through the openings 73 and against the inner surface of the inner pane.

In the embodiment shown in Figure 2, the duct 82, which corresponds with the rearwardly extending portion of the duct 37 in Figure 1, delivers the air which is drawn through and heated by the main radiator to an upper duct 86 which supplies the heated air from the main radiator to the windows, windshield, or other parts, for defrosting and the like. The heater at 100a may correspond with the heater shown and described in my copending application Serial No. 179,116, filed December 10, 1937. This heater 100a draws air from the interior of the vehicle and delivers the same through the duct 152a to a duct 85 disposed below the duct 86. The duct 85 has the registers 87 and 88 for controlling the discharge of this heated air into the vehicle. The upper duct 86 is broken away at 83 in Figure 2 to show the lower duct and the arrangement of the registers 87 and 88 with respect thereto.

While the shroud 35 is shown in Figure 1 as flaring out to substantially the entire width of the rear side of the radiator 11, it is to be understood that the flared end of this shroud may cover a lesser or greater area of the radiator, as desired. For example, where a greater circulation of air through the radiator and through the engine compartment is desired around the shroud, the flared end of the shroud may cover a lesser area of the radiator. The flared end of the shroud may cover the full area of the radiator or any lesser area as suitable or desired.

To prevent insufficient air circulation for motor cooling and resulting over-heating on warm days when the lateral registers and defrosters are closed, I provide the ducts 37 with by-pass openings 90, as shown in Figure 1. Valves or shutters 91, pivoted at 92 and provided with manual, thermostatic or other suitable control means operable, for example, from the driver's position, are adapted for closing and opening the valves 91 to different positions. When the valves 91 are closed the entire supply of heated air through the ducts 37 passes to the registers and defrosters, and by opening these valves to different positions different amounts of the air may be by-passed through the engine compartment 10.

The heating system above described provides a large volume of heated air adequately to heat the inside of the vehicle and to defrost and desleet and prevent condensation and moisture formation on all of the windows of the vehicle under the most severe weather conditions. The large volume of heated air provided by this and the succeeding embodiments of the invention, particularly provides for defrosting and desleeting and preventing the formation of condensation and moisture on all windows of the vehicle in a manner which cannot be provided by the limited amount of heated air supplied by the auxiliary hot water heaters of the prior art using hot water heaters which have been of limited capacity and low efficiency. Clear vision through all windows of the car is thus provided for at all times without the necessity of air circulating fans with their chilling effect on the passengers and without opening the windows to chill the passengers and endanger health.

The large volume of heated air provided by the heating system above described and by the succeeding embodiments of the invention adequately heats the interior of the vehicle under the most severe weather conditions, as already pointed out, and the duct system of distributing the heated air provides a uniform distribution for uniformly heating the interior of the vehicle instead of only heating the occupant of the right front seat without heating the other occupants, or uncomfortably heating the occupant at the driver's position, as is invariably the case with the average dash-type water heater of the prior art with its limited heating capacity and low efficiency. In other words, the heat is not all confined to one position, but is uniformly distributed through the interior of the vehicle, and this uniformly distributed heat is available in amount adequate to maintain the desired temperatures under all conditions.

The separately operable shutters or registers further provide for distributing the heated air through the interior of the vehicle as suitable or desired. For example, if there is a severe wind on one side of the vehicle, the registers or shutters on that side may be opened and the registers or shutters on the opposite side closed to concentrate the discharge of heated air into the cold side of the vehicle. With the present heaters, if there is a cold side wind, one side of the car is invariably unbearably cold, particularly near the floor.

In the embodiment of the invention shown in Figure 9, the adjustable register or shutter means 96 for controlling the discharge of heated air into the interior of the vehicle corresponds with the adjustable register or shutter means 38, 39 of the embodiment of the invention shown in Figure 1. In this case, however, electromagnetic means shown more or less diagrammatically at 97 is provided for operating the adjustable register or shutter means 96, and this electromagnetic means 97 is connected at 98 with a thermostat 99 for opening and closing the register or shutter means 96 in accordance with variations in temperature within the vehicle. The thermostat 99 is shown mounted in a depression in the back of the front seat 8a.

Figure 10:
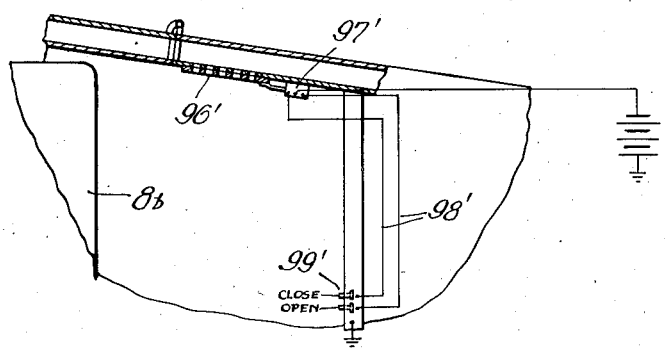
Figure 10 is a view similar to Figure 9, showing an electromagnet for operating the register through which the heated air is discharged into the vehicle, and a control button arrangement for the electromagnet.

The embodiment shown in Figure 10 is similar to the embodiment shown in Figure 9 except that the electromagnetic means 97', for operating the adjustable register or shutter means 96', is connected at 98' to button or other suitable control means 99' accessible to the driver from the driver's position for manually controlling the shutter means.

As shown in Figure 11, the back of the heater 100', which, in this view, is positioned toward the front of the vehicle, may be provided with a tube 160 leading to outside air. This tube is provided with a valve 162 which may be opened and closed as desired. This valve 162 may be operated by a rod or wire extending to the dash or instrument panel and provided with a suitable fingerpiece 163, or by a dash operated magnetic arrangement, or otherwise as desired. When the valve 162 is open, fresh air is admitted to the heater, where it may be warmed and delivered into the vehicle. This fresh air may be used to keep the interior of the vehicle at a pressure slightly above atmospheric pressure to prevent window leakage. This fresh air inlet further permits taking in fresh air during rain or snow storms without wetting the passengers, as is generally the case where the windows are opened, and, by the outward action of the warm air at the windows by the internal pressure above atmosphere, defrosting and desleeting is facilitated.

Alternatively the fresh air thus supplied may be heated and used for defrosting purposes. It will afford better defrosting because of the lower relative humidity as compared with the air taken from the passenger compartment of the vehicle.

It is present practice to cover the front of the main radiator to restrict air flow through it in cold weather. The covering of the back of the radiator as shown in Figure 1 restricts the air flow and slows down the travel of the air through the radiator so that it heats sufficiently to around 120 degrees F. When the registers are open, or relief openings thermostatically operated when the water temperatures become too high, the circulation is governed by one or the other, or both.

I have described the invention in connection with the details of particular embodiments, but I do not intend thereby to limit the invention to such details, nor do I intend to be limited to the particular embodiments and relation of the essential features shown and described.

I claim:

1. In a device of the class described, a side wall structure comprising an outer side wall and an inner side wall spaced therefrom, a window in said wall structure, a pair of ducts disposed in the space between the outer and inner walls of said side wall structure, and a heating system comprising means for heating air and circulating it through said ducts, one of said ducts having opening means for discharging the heated air therefrom internally of said inner wall and the other duct having opening means for discharging the heated air therefrom through the space between said outer and inner walls and to said window.

2. In a device of the class described, a wall structure comprising an outer wall and an inner wall spaced therefrom, a window, a pair of ducts disposed in the space between said outer and inner walls, a heating system comprising means for heating air and circulating it through said ducts, one of said ducts having opening means for discharging the heated air therefrom internally of said inner wall, the other duct having opening means for discharging the heated air therefrom and to said window, and an auxiliary heater for the air circulated through said last duct.

3. The combination with an automotive vehicle having a body provided with a side wall structure comprising an outer side wall and an inner side wall spaced inwardly therefrom, a window in said side wall structure, heat insulating means along the outer side wall, and means for heating air and circulating it directly through the space between the outer and inner side walls and for delivering a portion of the heated air circulated through said space into the interior of the vehicle and another portion of said heated air to said window.

4. The combination with an automotive vehicle having a body provided with a side wall structure comprising an outer side wall and an inner side wall spaced inwardly therefrom, window means in said side wall structure, and means for heating air and circulating it through the space between the outer and inner side walls and for delivering a portion of the heated air circulated through said space into the interior of the vehicle and another portion of the heated air circulated through said space to said window means.

5. The combination with an automotive vehicle having a body provided with a side wall structure comprising an outer side wall and an inner side wall spaced inwardly therefrom, window means in said side wall structure, and means for heating air and circulating it through the space between the outer and inner side walls and to said window means and against the glass thereof through said space.

HARRY C. STEARNS.